United States Patent [19]

Benjamin et al.

[11] 4,174,291

[45] Nov. 13, 1979

[54] CRYSTALLIZATION SEED-CONTAINING COMPOSITION

[75] Inventors: Lawrence Benjamin; Jay H. Saylor; Vernon A. Uchtman, all of Cincinnati, Ohio

[73] Assignee: The Procter & Gamble Company, Cincinnati, Ohio

[21] Appl. No.: 486,297

[22] Filed: Jul. 8, 1974

Related U.S. Application Data

[62] Division of Ser. No. 248,545, Apr. 28, 1972, abandoned.

[51] Int. Cl.$^2$ .............................................. C11D 7/12
[52] U.S. Cl. .................................. 252/156; 252/133; 252/135; 252/140; 252/160; 252/551
[58] Field of Search .............. 252/156, 133, 135, 140, 252/160, 551

[56] References Cited

U.S. PATENT DOCUMENTS

| 2,766,212 | 10/1956 | Grifo | 252/551 X |
| 3,658,727 | 4/1972 | Mast | 252/538 |
| 3,769,222 | 10/1973 | Yurko et al. | 252/89 |

FOREIGN PATENT DOCUMENTS

| 511607 | 4/1955 | Canada. |
| 607274 | 8/1948 | United Kingdom. |

*Primary Examiner*—Mayer Weinblatt
*Attorney, Agent, or Firm*—Robert B. Aylor; Richard C. Witte; Thomas H. O'Flaherty

[57] ABSTRACT

A composition of matter capable of rapidly reducing free metal ion concentration in an aqueous solution when added thereto containing a material capable of forming a water-insoluble reaction product with said free metal ions and a crystallization seed which provides growth sites for said reaction product so as to cause rapid precipitation of said reaction product. The rapid precipitation of the reaction product has the effect of rapidly reducing the free metal ion concentration of the aqueous solution.

13 Claims, No Drawings ical ions, e.g., calcium, magnesium, iron, and aluminum found in water to form a water-insoluble precipitate. The formation of this precipitate results in a "softened water," i.e. water that contains relatively little free metal ions. These known compositions of matter are very effective in softening water in a relatively short period of time. However, there is a need in certain applications for an even more rapid removal of the free metal ions.

In particular, it is known that many, though not all, detergent compositions containing a water-soluble detergent perform best when used in an aqueous wash solution containing substantially no free polyvalent metal ions. This is because when many water-soluble synthetic detergents come in contact with free metal ions in the wash solution, there is formed a reaction product. The formation of this reaction product results in a poorer performing detergent composition, i.e. part of the organic detergent is "tied up" thereby leaving less detergent to perform its cleaning functions.

Another effect caused by free metal ions in an aqueous wash solution intended for the washing of soiled fabrics is that there is an interaction between the soil from the fabric and the free polyvalent metal ions. This interaction reduces the efficiency of the organic detergent by making the soils on the fabrics more difficult to remove.

Because of the aforediscussed reasons, many detergent compositions containing a water-soluble organic detergent intended for use in washing soiled fabrics in ordinary tap water (typically containing from 5 grains to 9 grains per gallon of free metal ions) have included therewith a builder material capable of "tying up" or sequestering the free metal ions. This "tying up" allows the organic detergent to perform its cleaning function unhindered by the free metal ions. Additionally, the tie up of free metal ions prevents a soil and free metal ion interaction to occur. Some builders form a soluble complex with the free metal ions. Other builders, e.g. the water-soluble salts of carbonates, are of the precipitating type. Unfortunately, some of the builders used in detergent compositions do not reduce the free metal ion content fast enough. That is, the builder competes with the organic detergent and the soil for the free metal ions. The result is that while some of the free metal ions are tied up or sequestered by the sequestrant, some do react with the organic detergent and the soil. To the extent that the latter two conditions occur, the cleaning performance of the organic detergent is decreased.

Accordingly, there is a need for a composition of matter to rapidly reduce the free metal ion concentration of an aqueous solution.

CRYSTALLIZATION SEED-CONTAINING COMPOSITION

This is a division, of application Ser. No. 248,545, filed Apr. 28, 1972.

BACKGROUND OF THE INVENTION

This invention relates to compositions of matter capable of rapidly reducing the free metal ion content of an aqueous solution. More particularly, it relates to a detergent composition capable of rapidly reducing the free metal ion content of an aqueous wash solution.

Compositions of matter intended for use in softening water have been known previously. Generally these compositions contain a material which reacts with free metal ions, e.g., calcium, magnesium, iron, and aluminum found in water to form a water-insoluble precipitate. The formation of this precipitate results in a "softened water," i.e. water that contains relatively little free metal ions. These known compositions of matter are very effective in softening water in a relatively short period of time. However, there is a need in certain applications for an even more rapid removal of the free metal ions.

It is, therefore, an object of this invention to provide a composition of matter capable of rapidly reducing the free metal ion content of a solution.

It is another object of this invention to provide a composition of matter capable of rapidly reducing the free metal ion content of an aqueous solution.

A still further object of this invention is to provide a detergent composition that is capable of rapidly reducing the free metal ion content of an aqueous solution.

Another object of this invention is to provide a detergent composition that reduces the free metal ion content by providing growth sites for the rapid growth of water-insoluble salts of the said free metal ions.

These and other objects will become apparent from the description to follow.

As used herein throughout, all percentages are by weight unless otherwise stated.

SUMMARY OF THE INVENTION

A composition which is capable of rapidly reducing free metal ion concentration in an aqueous solution when added thereto, which consists essentially of:

(a) a material capable of forming a water-insoluble reaction product with said free metal ions; and (b) a crystallization seed which is capable of providing growth sites for said reaction product so as to cause rapid precipitation of said reaction product thereby reducing said free metal ion concentration.

DESCRIPTION OF THE INVENTION

The present invention relates to compositions of matter capable of rapidly reducing the free metal ion content of water. A particularly preferred aspect of this invention relates to substantially dry detergent compositions intended for use in aqueous solutions containing water-soluble organic detergents, and materials that provide for the rapid reduction of free metal ions from the aqueous solution.

Free metal ions as used throughout herein is intended to include all metal ions found in water. With respect to detergent compositions, the free metal ions particularly desired to be removed are those ions that interfere with the performance of a detergent, e.g., calcium, magnesium, iron, and aluminum.

The composition of matter which is capable of rapidly reducing free metal ions from an aqueous solution contains as one of its essential ingredients a water-soluble material capable of forming a water-insoluble reaction product with the free metal ions. By water-insoluble reaction product is meant a material having a solubility in water of less than $1.4 \times 10^{-2}$ weight percent at 25° C., preferably less than $7.2 \times 10^{-3}$ weight percent at 25° C. Examples of such materials are water soluble salts of carbonates, bicarbonates, sesquicarbonates, silicates, aluminates, oxalates and fatty acids having 12 to 22 carbon atoms. Water-soluble cations of such materials are sodium, potassium, ammonium and substituted ammonium, e.g., triethanolamine. The contribution, in part, provided by these compounds is that they provide an anion capable of reacting with a free metal ion so as to produce a water-insoluble reaction product. This reaction product is effectively and rapidly removed from solution as hereinafter discussed.

The other essential component of the composition of matter of this invention is a crystallization seed which is capable of forming growth sites for the reaction product of the anion of the aforementioned component of this composition and the free metal ions. The presence of this crystallization seed allows for the rapid precipitation of the reaction product and, hence, rapid reduction in free metal ion content. By rapid reduction of free metal ion concentration is meant the reduction of the content of a particular free metal ion to a concentration of less than 0.5 grains per gallon within 120 seconds after addition of the composition of this invention to water, preferably to less than 0.1 grains per gallon within 30 seconds. As used herein, the free metal ion content of an aqueous solution is expressed as a number of grains equivalent to calcium carbonate per gallon.

Any crystallization seed that provides a growth site for the reaction product of the free metal ions and first discussed component of the present composition of matter is suitable. The seed material need not have the same anion or cation of the material capable of forming a water-insoluble reaction product with the free metal ions. Examples of crystallization seeds are sparingly soluble compounds, i.e., those compounds that are not completely dissolved in water within about 120 seconds at 25° C. Illustrative of such compounds are calcium carbonate, calcium and magnesium oxalate, barium sulfate, calcium, magnesium and aluminum silicates, calcium and magnesium oxide, calcium and magnesium salts of fatty acids having 12 to 22 carbon atoms, calcium and magnesium hydroxide, calcium fluoride, barium carbonate, and mixed salts such as calcium-magnesium silicates, and calcium-aluminum silicates. Insoluble cellulose derivatives, e.g. cellulose linters, are further examples of crystallization seeds useful in this invention. This listing is representative of the crystallization seeds suitable for use in this invention and is not intended to be exclusive to other compounds suitable for use herein.

An essential characteristic of the crystallization seed is that it have a maximum particle dimension of less than 20 microns, preferably from 0.01 micron to 5 microns. The need to have a crystallization seed particle size less than 20 microns is because of the need to have as large a seed surface area per unit weight of seed material as possible for the most beneficial performance of the total composition. That is, if the seed particle size is too large, the growth of the water-insoluble reaction product will be too slow with the result being that the free metal ion content reduction will not be rapid enough. Most importantly is the fact that a sufficiently large crystal surface area in solution be present for rapid growth to occur thereon.

The amount of crystallization seed included in the composition is dependent on the free metal ion content of the water into which it will be added, the temperature of the water, the particular material capable of forming a water-insoluble reaction product with free metal ions, and the amount of effective surface area of seed material per unit weight. Preferably, the composition consists essentially of the material capable of forming a water-insoluble reaction product with free metal ions and the crystallization seed in a ratio by weight of from 1:10 to 100:1, respectively, preferably from 1:3 to 20:1.

Compositions of this invention may be used as additives to be added to wash water prior to adding a detergent composition or can be a part of a total detergent composition.

The preferred composition of matter of this invention is a substantially dry detergent composition consisting essentially of (a) a water-soluble organic detergent selected from the group consisting of anionic, nonionic, zwitterionic, and ampholytic detergents, (b) a material capable of forming a water-insoluble reaction product with free metal ions and (c) a crystallization seed. The detergent used in conjunction with (b) and (c) must itself not interfere with the operation of the seed crystal. That is, the rate of free metal ion content reduction is dependent, in part, on the initial concentrations of the free metal ions in solution and the anion of the material capable of producing a water-insoluble reaction product. Any detergent that reduces the "effective concentration" of these materials is herein referred to as an interfering detergent. For instance, certain anionic detergents are capable of interacting with free metal ions in solution so that these ions are prevented from growing on the crystallization seed. Additionally, certain cationic detergents interact with the anion concentration supplied by the material capable of producing a water-insoluble reaction product.

Another way in which it is believed a detergent may interfere with the function of the seed crystal is by its being adsorbed onto the surface of the seed crystal to the extent that the effective growth site area is sufficiently reduced so as to substantially hinder the free metal content reduction. The reduction of the effective growth site area has the effect of slowing down the rate at which free metal ions are removed from solution.

It should be realized that at certain concentrations of crystallization seed and the material capable of forming a water-insoluble reaction product, a particular organic detergent will be non-interfering, while at other concentration the same detergent could be interfering. As used throughout herein, non-interfering detergent is defined to mean a water-soluble detergent that does not prevent the material capable of forming a water-insoluble reaction product and crystallization seed from its function, i.e. reducing the free metal ion content to less than 0.5 grains of calcium carbonate per gallon water within 120 seconds. Whether a particular detergent interferes with the function of the other components or not can be determined by routine experimentation.

The above detergent composition performs eminently well in cleaning soiled fabrics due to the fact that the free metal ions normally found in wash water is rapidly reduced by the other two components thereby allowing the detergent to perform its cleaning function unhindered by free metal ion-detergent and/or -soil interactions. Particularly desired is the reduction of calcium, magnesium, iron and/or aluminum ions from the wash water.

The amounts of each component of this preferred detergent composition is 5% to 50%, preferably 15% to 30% of a water-soluble non-interfering organic detergent, from 20% to 80%, preferably 20% to 50% of a material capable of producing a water-insoluble reaction product with free metal ions, and from 0.1% to 60% preferably 0.5% to 40% of a crystallization seed. The material capable of forming a water-insoluble reaction product and the crystallization seed have been previously described and exemplified.

In practice when the detergent composition of this invention is added to an aqueous wash solution containing soiled fabrics, the free metal ions immediately react with the anion of the material capable of producing a water-insoluble reaction product. Immediately, the resultant reaction product begins to grow on the seed crystal. That is, because the crystallization seed provides growth sites for said reaction product, the reaction product associates therewith and in effect precipitates from the wash solution as a water-insoluble material. Additionally, free metal ions and anions supplied by the material capable of forming a water-insoluble reaction product individually associate with the crystallization seed—thereby having the effect of reducing the free metal ion content of the aqueous solution.

In the absence of the inclusion of a crystallization seed in the detetergent composition, the reaction product that would form between the free metal ion and the material capable of forming a water-insoluble reaction product would indeed produce a water-insoluble reaction product. However, this reaction and, hence, reduction of free metal ions is relatively slow—thereby allowing a competing reaction between the free metal ions and the organic detergent and/or soil to occur. Additionally, the precipitate that is produced may deposit itself onto the fabric or grow thereon—thus giving the fabric an "unclean" appearance, color diminution and harsh feel.

With respect to a detergent composition that contains a water-soluble carbonate salt as the material capable of producing the water-insoluble reaction product and calcium carbonate as the seed crystal material the resultant precipitate that forms between the calcium ions supplied by the water and the anion of the alkali metal carbonate remains suspended in the wash water. That is, it does not form on fabrics. The effect of this is that the precipitate is more easily disposed of by way of a rinse cycle.

The water-soluble non-interfering organic detergents of this invention are selected from the group consisting of anionic, nonionic, zwitterionic and ampholytic detergents. Examples of such detergents follow:

A. Anionic Soap and Non-Soap Synthetic Detergents

This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Napthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap.

This class of detergents also includes water-soluble salts, particularly the alkali metal salts of organic sulfuric reaction products having in their molecular structure an alkyl radical containing from about 8 to about 22 carbon atoms and a sulfonic acid or sulfuric acid ester radical. (Included in the term alkyl is the alkyl portion of higher acyl radicals.) Examples of this group of synthetic detergents which form a part of the preferred built detergent compositions of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, in straight chain or branched chain configuration, e.g. those of the type described in U.S. Pat. Nos. 2,220,099 and 2,477,383 (especially valuable are linear straight chain alkyl benzene sulfonates in which the average of the alkyl groups is about 13 carbon atoms abbreviated hereinafter as $C_{13}LAS$); sodium alkyl glyceryl ether sulfonates, especially those ethers of higher alcohols derived from tallow and coconut oil; sodium coconut oil fatty acid monoglyceride sulfonates and sulfates; sodium or potassium salts of sulfuric acid esters of the reaction product of one mole of a higher fatty alcohol (e.g. tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain about 8 to about 12 carbon atoms.

Anionic phosphate surfactants are also useful in the present invention. These are surface active materials having substantial detergent capability in which the anionic solubilizing group connecting hydrophobic moieties is an oxy acid of phosphorus. The more common solubilizing groups, of course, are —$SO_4H$, —$SO_3H$, and —$CO_2H$. Alkyl phosphate esters such as $(R\text{-}O)_2PO_2H$ and $ROPO_3H_2$ in which R represents an alkyl chain containing from about 8 to about 20 carbon atoms are useful.

These esters can be modified by including in the molecule from one to about 40 alkylene oxide units, e.g., ethylene oxide units. Formulae for these modified phosphate anionic detergents are

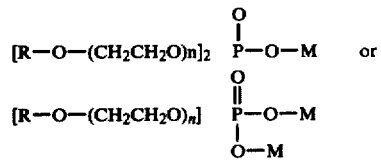

in which R represents an alkyl group containing from about 8 to 20 carbon atoms, or an alkylphenyl group in which the alkyl group contains from about 8 to 20 carbon atoms, and M represents a soluble cation such as hydrogen, sodium, potassium, ammonium or substituted ammonium; and in which n is an integen from 1 to about 40.

Another class of suitable anionic organic detergents particularly useful in this invention includes salts of 2-acyloxyalkane-1-sulfonic acids. These salts have the formula

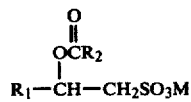

where $R_1$ is alkyl of about 9 to about 23 carbon atoms (forming with the two carbon atoms an alkane group); $R_2$ is alkyl of 1 to about 8 carbon atoms; and M is a salt-forming radical.

The salt-forming radical M in the hereinbefore described structural formula is a water-solubilizing cation and can be, for example, an alkali metal cation (e.g. sodium, potassium, lithium), ammonium or substituted-ammonium cation. Specific examples of substituted ammonium cations include methyl-, dimethyl-, and trimethyl- ammonium cations and quaternary ammonium cations such as tetramethyl-ammonium and dimethyl piperdinium cations and those derived from alkylamines such as ethylamine, diethylamine, triethylamine, mixtures thereof, and the like.

Specific examples of beta-acyloxy-alkane-1-sulfonates, or alternatively 2-acyloxy-alkane-1-sulfonates, utilizable herein to provide superior cleaning levels under substantially neutral washing conditions include the sodium salt of 2-acetoxy-tridecane-1-sulfonic acid; the potassium salt of 2-propionyloxy-tetradecane-1-sulfonic acid; the lithium salt of 2-butanoyloxy-tetradecane-1-sulfonic acid; the sodium salt of 2-pentanoyloxy-pentadecane-1-sulfonic acid; the sodium salt of 2-acetoxy-hexadecane-1-sulfonic acid; the potassium salt of 2-octanoyloxy-tetradecane-1-sulfonic acid; the sodium salt of 2-acetoxy-heptadecane-1-sulfonic acid; the lithium salt of 2-acetoxy-octadecane-1-sulfonic acid; the potassium salt of 2-acetoxy-nonadecane-1-sulfonic acid; the sodium salt of 2-acetoxy-uncosane-1-sulfonic acid; the sodium salt of 2-propionyloxy-docosane-1-sulfonic acid; the isomers thereof.

Preferred beta-acyloxy-alkane-1-sulfonate salts therein are the alkali metal salts of beta-acetoxy-alkane-1-sulfonic acids corresponding to the above formula wherein $R_1$ is an alkyl of about 12 to about 16 carbon atoms, these salts being preferred from the standpoints of their excellent cleaning properties and ready availability.

Typical examples of the above described beta-acetoxy alkanesulfonates are described in the literature: Belgium Patent 650,323 issued July 9, 1963, discloses the preparation of certain 2-acyloxy alkanesulfonic acids. Similarly, U.S. Pat. Nos. 2,094,451 issued September 28, 1937, to Guenther et al. and 2,086,215 issued July 6, 1937 to DeGroote disclose certain salts of beta-acetoxy alkanesulfonic acids. These references are hereby incorporated by reference.

A preferred class of anionic organic detergents are the beta-alkyloxy alkane sulfonates. These compounds have the following formula:

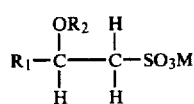

where $R_1$ is a straight chain alkyl group having from 6 to 20 carbon atoms, $R_2$ is a lower alkyl group having from 1 to 3 carbon atoms, and M is a salt-forming radical hereinbefore described.

Specific examples of beta-alkyloxy alkane sulfonates or alternatively 2-alkyloxy-alkane-1-sulfonates, utilizable herein to provide superior cleaning and whitening levels under household washing conditions include:
potassium beta-methoxydecanesulfonate,
sodium beta-methoxy-tridecanesulfonate,
potassium beta-ethoxytetradecylsulfonate,
sodium beta-isopropoxyhexadecylsulfonate,
lithium beta-tertbutoxytetradecylsulfonate,
sodium beta-methoxyoctadecylsulfonate, and
ammonium beta-n-propoxydodecylsulfonate.

Other synthetic anionic detergents useful herein are alkyl ether sulfates. These materials have the formula $RO(C_2H_4O)_xSO_3M$ wherein R is alkyl or alkenyl of about 10 to about 20 carbon atoms, x is 1 to 30, and M is a salt-forming cation defined hereinbefore.

The alkyl ether sulfates of the present invention are condensation products of ethylene oxide and monohydric alcohols having about 10 to about 20 carbon atoms. Preferably, R has 14 to 18 carbon atoms. The alcohols can be derived from fats, e.g., coconut oil or tallow, or can be synthetic. Lauryl alcohol and straight chain alcohols derived from tallow are preferred herein. Such alcohols are reacted with 1 to 30, and especially 6, molar proportions of ethylene oxide and the resulting mixture of molecular species, having, for example, an average of 6 moles of ethylene oxide per mole of alcohol, is sulfated and neutralized.

Specific examples of alkyl ether sulfates of the present invention are sodium coconut alkyl ethylene glycol ether sulfate; lithium tallow alkyl triethylene glycol ether sulfate; and sodium tallow alkyl hexaoxyethylene sulfate.

Preferred herein for reasons of excellent cleaning properties and ready availability are the alkali metal coconut- and tallow-alkyl oxyethylene ether sulfates having an average of about 1 to about 10 oxyethylene moieties. The alkyl ether sulfates of the present invention are known compounds and are described in U.S. Pat. No. 3,332,876 to Walker (July 25, 1967) incorporated herein by reference.

Additional examples of anionic non-soap synthetic detergents which come within the terms of the present invention are the reaction product of fatty acids esterified with isethionic acid and neutralized with sodium hydroxide where, for example, the fatty acids are derived from coconut oil; sodium or potassium salts of fatty acid amide of methyl tauride in which the fatty acids, for example, are derived from coconut oil. Other anionic synthetic detergents of this variety are set forth in U.S. Pat. Nos. 2,486,921; 2,486,922; and 2,396,278.

Additional examples of anionic, non-soap, synthetic detergents, which come within the terms of the present invention, are the compounds which contain two anionic functional groups. These are referred to as di-anionic detergents. Suitable di-anionic detergents are the disulfonates, disulfates, or mixtures thereof which may be represented by the following formulae:

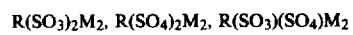

where R is an acyclic aliphatic hydrocarbyl group having 15 to 20 carbon atoms and M is a water-solubilizing cation, for example, the $C_{15}$ to $C_{20}$ disodium 1,2-alkyldisulfates, $C_{15}$ to $C_{20}$ dipotassium-1,2-alkyldisulfonates or disulfates, disodium 1,9-hexadecyl disulfates, $C_{15}$ to $C_{20}$ disodium-1,2-alkyldisulfonates, disodium 1,9-stearydisulfates and 6,10-octadecyldisulfates.

The aliphatic portion of the disulfates or disulfonates is generally substantially linear, desirable, among other reasons, because it imparts desirable biodegradable properties to the detergent compound.

The water-solubilizing cations include the customary cations known in the detergent art, i.e., the alkali metals, and the alkaline earth metals, as well as other metals in group IIA, IIB, IIIA, IVA and IVB of the Periodic Table except for Boron. The preferred water-solubilizing cations are sodium or potassium. These dianionic detergents are more fully described in British Letters Patent No. 1,151,392 which claims priority on an application made in the United States of America (Ser. No. 564,566) on July 12, 1966.

Additional examples of anionic non-soap synthetic detergents which come within the terms of the present invention are the reaction product of fatty acids esterified with isethionic acid and neutralized with sodium hydroxide where, for example, the fatty acids are derived from coconut oil; sodium or potassium salts of fatty acid amide of methyl tauride in which the fatty acids, for example, are derived from coconut oil. Other anionic synthetic detergents of this variety are set forth in U.S. Pat. Nos. 2,486,921, 2,486,922; and 2,396,278.

Still other anionic synthetic detergents include the class designated as succinamates. This class includes such surface active agents as disodium N-octadecylsulfo succinamate; tetrasodium N-(1,2-dicarboxyethyl)-N-octadecyl-sulfo-succinamate; diamyl ester of sodium sulfosuccinic acid; dihexyl ester of sodium sulfosuccinic acid; dioctyl ester of sodium sulfosuccinic acid.

Other suitable anionic detergents utilizable herein are olefin sulfonates having about 12 to about 24 carbon atoms. The term "olefin sulfonates" is used herein to mean compounds which can be produced by the sulfonation of alpha-olefin by means of uncomplexed sulfur trioxide, followed by neutralization of the acid reaction mixture in conditions such that any sultones which have been formed in the reaction are hydrolyzed to give the corresponding hydroxy-alkanesulfonates. The sulfur trioxide may be liquid or gaseous, and is usually, but not necessarily, diluted by inert diluents, for example, by liquid $SO_2$, chlorinated hydrocarbon, etc., when used in the liquid form, or by air, nitrogen, gaseous $SO_2$, etc., when used in the gaseous form.

The alpha-olefins from which the olefin sulfonates are derived from mono-olefins having 12 to 24 carbon atoms, preferably 14 to 16 carbon atoms. Preferably, they are straight chain olefins. Examples of suitable 1-olefins include 1-dodecene; 1-tetradecene; 1-hexadecene; 1-octadecene; 1-eicosene and 1-tetracosene.

In addition to the true alkene sulfonates and a proportion of hydroxy-alkanesulfonates, the olefin sulfonates can contain minor amounts of other materials, such as alkene disulfonates depending upon the reaction conditions, proportions of reactants, the nature of the starting olefins and impurities in the olefin stock and side reactions during the sulfonation process.

A specific anionic detergent which has also been found excellent for use in the present invention is described more fully in the U.S. Pat. No. 3,332,880 of Phillip F. Pflaumer and Adriaan Kessler, issued July 25, 1967, titled Detergent Composition, the disclosure of which is herein incorporated by reference.

B. Nonionic Synthetic Detergents

Nonionic synthetic detergents may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

For example, a well known class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

(1) The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

(2) Those derived from the condensation of ethylene oxide with the product resulting from the reaction of propylene oxide and ethylene diamine. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 and 3,000, are satisfactory.

(3) The condensation product of aliphatic alcohols having from 8 to 22 carbon atoms, in either straight chain or branched chain configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms.

(4) Nonionic detergents include nonyl phenol condensed with either about 10 or about 30 moles of ethylene oxide per mole of phenol and the condensation products of coconut alcohol with an average of either about 5.5 or about 15 moles of ethylene oxide per mole of alcohol and the condensation product of about 15 moles of ethylene oxide with one mole of tridecanol.

Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan; bis-(N-2-hydroxyethyl) lauramide; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; and di-isooctylphenol condensed with 15 moles of ethylene oxide.

(5) A detergent having the formula $R^1R^2R^3N \rightarrow O$ (amine oxide detergent) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and 0 ether linkages, and each $R^2$ and $R^3$ are selected from the group consisting of alkyl radicals and hydroxyalkyl radicals containing from 1 to about 3 carbon atoms.

Specific examples of amine oxide detergents include: dimethyldodecylamine oxide, dimethyltetradecylamine oxide, ethylmethyltetradecylamine oxide, cetyldimethylamine oxide, dimethylstearylamine oxide, cetylethylpropylamine oxide, diethyldodecylamine oxide, diethyltetradecylamine oxide, dipropyldodecylamine oxide, bis-(2-hydroxyethyl)dodecylamine oxide, bis-(2-hydroxyethyl)-3-dodecoxy-1-hydroxypropylamine oxide, (2-hydroxypropyl)methyltetradecylamine oxide, dimethyloleyamine oxide, dimethyl-(2-hydroxydodecyl)amine oxide, and the corresponding decyl, hexadecyl and octadecyl homologs of the above compounds.

(6) A detergent having the formula $R^1R^2R^3P \rightarrow 0$ (phosphine oxide detergent) wherein $R'$ is an alkyl group containing from about 10 to about 28 carbon atoms, from 0 to about 2 hydroxy groups and from 0 to about 5 ether linkages, there being at least one moiety of $R'$ which is an alkyl group containing from about 10 to about 18 carbon atoms and 0 ether linkages, and each of $R^2$ and $R^3$ are selected from the group consisting of alkyl radicals and hydroxyalkyl radicals containing from 1 to about 3 carbon atoms.

Specific examples of the phosphine oxide detergents include: dimethyldodecylphosphine oxide, dimethyltetradecylphosphine oxide, ethylmethyltetradecylphosphine oxide, cetyldimethylphosphine oxide, dimethylstearylphosphine oxide, cetylethylpropylphosphine oxide, diethyldodecylphosphine oxide, diethyltetradecylphosphine oxide, dipropyldodecylphosphine oxide, bis(hydroxymethyl)dodecylphosphine oxide, bis-(2-hydroxyethyl)dodecylphosphine oxide, (2-hydroxypropyl)methyltetradecylphosphine oxide, dimethyloleylphosphine oxide, and dimethyl-(2-hydroxydodecyl)phosphine oxide and the corresponding decyl, hexadecyl, and octadecyl homologs of the above compounds.

(7) A detergent having the formula

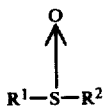

(sulfoxide detergent) wherein $R^1$ is an alkyl radical containing from about 10 to about 28 carbon atoms, from 0 to about 5 ether linkages and from 0 to about 2 hydroxyl substituents at least one moiety of $R^1$ being an alkyl radical containing 0 ether linkages and containing from about 10 to about 18 carbon atoms, and wherein $R^2$ is an alkyl radical containing from 1 to 3 carbon atoms and from one to two hydroxyl groups: octadecyl methyl sulfoxide, dodecyl methyl sulfoxide, tetradecyl methyl sulfoxide, 3-hydroxytridecyl methyl sulfoxide, 3-methoxytridecyl methyl sulfoxide, 3-hydroxy-4-dodecoxybutyl methyl sulfoxide, octadecyl 2-hydroxyethyl sulfoxide, dodecylethyl sulfoxide.

C. Ampholytic Synthetic Detergents

Ampholytic synthetic detergents can be broadly described as derivatives of aliphatic or aliphatic derivatives of heterocyclic secondary and tertiary amines, in which the aliphatic radical may be straight chain or branched and wherein one of the aliphatic substituents contains from about 8 to 18 carbon atoms and at least one contains an anionic water-solubilizing group, e.g., carboxy, sulfo, sulfato. Examples of compounds falling within this definition are sodium 3-(dodecylamino)-propionate, sodium 3-(dodecylamino)propane-1-sulfonate, sodium 2-(dodecylamino)ethyl sulfate, sodium 2-(dimethylamino)octadecanoate, disodium 3-(N-carboxymethyldodecylamino)propane-1-sulfonate, disodium octadecyl-iminodiazetate, sodium 1carboxymethyl-2-undecylimidazole, and sodium N,N-bis(2-hydroxyethyl)-2-sulfato3-dodecoxypropylamine.

D. Zwitterionic Synthetic Detergents

Zwitterionic synthetic detergents can be broadly described as derivatives of aliphatic quaternary ammonium and phosphonium or tertiary sulfonium compounds, in which the cationic atom may be part of a heterocyclic ring, and in which the aliphatic radical may be straight chain or branched, and wherein one of the aliphatic substituents contains from about 3 to 18 carbon atoms, and at least one aliphatic substituent contains an anionic water-solubilizing group, e.g., carboxy, sulfo, sulfato, phosphato, or phosphono. Examples of compounds falling within this definition are 3-(N,N-dimethyl-N-hexadecyl-ammonio)-2-hydroxypropane-1-sulfonate, 3-(N,N-dimethyl-N-hexadecylammonio)propane-1-sulfonate, 2-(N,N-dimethyl-N-dodecylammonio)acetate, 3-(N,N-dimethyl N-dodecylammonio)propionate, 2-(N,N-dimethyl-N-octadecylammonio)-ethyl sulfate, 2-(trimethylammonio)ethyl dodecylphosphonate, ethyl 3-(N,N-dimethyl-N-dodecylammonio)propylphosphonate, 3-(P,P-dimethyl-P-dodecylphosphonio)-propane-1-sulfonate, 2-(S-methyl-S-tert.hexadecyl-sulfonio)ethane-1-sulfonate, 3-(S-methyl-S-dodecylsulfonio)propionate, sodium 2-(N,N-dimethyl-N-dodecylammonio)ethyl phosphonate, 4-(S-methyl-S-tetradecylsulfonio)butyrate, 1-(2-hydroxyethyl)-2-undecylimidazolium-1-acetate, 2-(trimethylammonio)octadecanoate, and 3-(N,N-bis-(2-hydroxyethyl)-N-octodecylammonio)-2-hydroxypropane-1-sulfonate. Some of these detergents are described in the following U.S. Pat. Nos. 2,129,264; 2,178,353; 2,774,786; 2,813,893; and 2,828,332.

Preferred detergents are the water-soluble organic nonionic detergents, the water-soluble salts or sulfuric acid esters of the reaction product of one mole of a higher fatty alcohol, i.e. containing from 10 to 18 carbon atoms, with from 3 to 12 moles of ethylene oxide and dimethyl alkyl ammonio propane sulfonate wherein the alkyl group contains 12 to 16 carbon atoms. The ethoxylated alcohols having an alkyl chain length of 10 to 18 carbon atoms and from 4 to 13 ethylene oxide and dimethyl alkyl ammonio propane sulfonates are especially preferred in that it has been found that these detergents are non-interfering detergents at all concentrations of the crystallization seed and the material capable of producing a water-insoluble reaction product.

The composition of matter of this invention are combined with the detergent to form flake, granular, or powder detergent composition that are substantially dry. Generally, the amount of water contained therein to give such a composition has a less than 10% total water content.

Any of the usual detergent composition adjuvants, diluents, and additives may be included in the detergent compositions of this invention. For example, perfumes, anti-tarnishing agents, inert salts such as sodium sulfate, anti-redeposition agents, fluorescers, suds builders, suds depressors, and the like may be utilized herein.

Generally, the detergent composition is added to water to form an aqueous solution containing from 0.02% to 1.0% of the composition. Soiled fabrics contained in the water is then washed with the solution for from 5 minutes to 30 minutes. When the composition of matter of this invention is used as a pre-add, from 0.02% to 1.0% of a detergent composition containing an alkaline builder salt and a water-soluble organic detergent in a ratio by weight of from 1:10 to 10:1 by weight is thereafter added.

The following examples are illustrative of the invention:

EXAMPLE I

Three identical aqueous solutions containing 7 grains of free metal ions and having a temperature of 48° C. were prepared. Into solution No. 1 was added sodium carbonate to produce a solution having 0.032% sodium carbonate. Into solution No. 2 was added sodium carbonate and calcium carbonate. The percentages by weight were 0.032% sodium carbonate and 0.01% calcium carbonate. Solution No. 3 had added to it sodium carbonate, sodium sesquicarbonate, calcium carbonate, and an ethoxylated secondary alcohol having 9 ethylene oxide units and an average alkyl chain length of 13 carbon atoms in amounts to produce concentrations of 0.032%, 0.023%, 0.008%, and 0.025%, respectively. The average maximum particle size of the calcium carbonate was 5 microns. The amount of free calcium ion concentration was determined 30 seconds, 60 seconds, and 120 seconds from time of addition to each solution. The results were as follows:

|  | 0 sec. | 30 sec. | 60 sec. | 120 sec. |
|---|---|---|---|---|
| Solution No. 1 | grains | 2.1 grains | 1.8 grains | 1.0 grains |
| Solution No. 2 | " | 0.6 grains | 0.3 grains | 0.15 grains |
| Solution No. 3 | " | 0.4 grains | 0.2 grains | 0.15 grains |

The above tests show that the compositions of this invention, i.e. those compositions added to Solutions No. 2 and No. 3 resulted in an accelerated reduction of the free metal ion concentration of an aqueous solution relative to the rate of reduction of the free metal ion concentration of Solution No. 1.

EXAMPLE II

The following detergent compositions are tested for cleaning performance.

|  | Composition A | Composition B |
|---|---|---|
| Sodium carbonate | 25% | 25% |
| Calcium carbonate (maximum particle size = 10 microns) | — | 20% |
| Sodium salt of a sulfated $C_{16}$ alkyl ethoxylated with 3 moles of ethylene oxide | 20% | 20% |
| Sodium silicate ($SiO_2:Na_2O$ = 2.0) | 20% | 10% |
| Sodium sulfate | 33% | 23% |
| Balance (water) | 2% | 2% |

Wash solutions of 7 grain hardness water having a temperature of 100° F. and containing 0.12% of the detergent composition to be tested are prepared. Into each of the two washing machines containing the solutions are placed a set of 8 similarly soiled fabric half swatches. Each full swatch had been cut in half with the individual halves forming parts of each set. One set of swatches is washed for 10 minutes with Composition A while the other set of swatches is washed for 10 minutes with Composition B. At the end of the wash cycle, the swatches are rinsed, dried, and graded. The grading is done by visually examining each half swatch and assigning a number ranging from 0 for an unwashed soiled swatch to 10 for a completely unsoiled swatch.

Results of the test are in the following order of magnitude:

|  | Grade |
|---|---|
| Composition A | 5 |
| Composition B | 8 |

The above tests shows that the composition of this invention, i.e. Composition B, significantly cleaned better than the prior art composition, Composition A.

EXAMPLE III

When Example II is repeated with the substitution of calcium oxide having a similar particle size for calcium carbonate at the same level, substantially similar results are obtained.

EXAMPLE IV

Example II is repeated except for substituting a coconut alcohol ethoxylated with 6 moles of ethylene oxide for the sulfate $C_{16}$ ethoxylate. The results are of the following order of magnitude:

|  | Grade |
|---|---|
| Composition A | 4 |
| Composition B | 7 |

The following examples are further illustrative of the compositions of this invention:

EXAMPLE V

| Sodium oxalate | 1 part |
|---|---|
| Calcium oxalate | 10 parts |

EXAMPLE VI

| Potassium sesquicarbonate | 100 parts |
|---|---|
| Aluminum silicate | 1 part |

EXAMPLE VII

| Sodium carbonate | 75% |
|---|---|
| Magnesium oxide | 0.1% |
| Sodium silicate ($SiO_2:Na_2O$ = 1.6) | 5% |
| Sodium sulfate | 5% |
| Sodium salt of a sulfated $C_{12}$ alkyl ethoxylated with 5 moles of ethylene oxide | 10% |
| Water | 4.9% |

EXAMPLE VIII

| Sodium salt of tallow fatty acid | 40% |
|---|---|
| Calcium hydroxide | 10% |
| $C_{12}$ dimethyl amine oxide | 47% |
| Water | 3% |

What is claimed is:

1. A substantially dry detergent composition consisting essentially of:

(a) from 5% to 50% of a water-soluble organic detergent selected from the group consisting of alkyl ether sulfates of the formula $RO(C_2H_4O)_xSO_3M$

wherein R is alkyl or alkenyl of from about 10 to about 20 carbon atoms, x is 1 to 30, and M is a salt forming cation; the condensation product of an aliphatic alcohol having from 8 to 22 carbon atoms and from 5 to 30 moles of ethylene oxide; and an amine oxide of the formula $$R^1R^2R^3N \rightarrow O$$

wherein $R^1$ is an alkyl group containing from about 10 to about 28 carbon atoms, from 0 to about 2 hydroxy groups and from 0 to about 5 ether linkages, and $R^2$ and $R^3$ are selected from the group consisting of alkyl radicals and hydroxy alkyl radicals containing from about 1 to about 3 carbon atoms;

(b) from 20% to 80% of a material selected from the group consisting of water-soluble salts of carbonates, bicarbonates and sesquicarbonates; and (c) from 0.1% to 60% of calcium carbonate particles having a maximum particle dimension of less than 20 microns.

2. The composition of claim 1 wherein the nonionic organic detergent is the condensation product of an aliphatic alcohol having from 8 to 22 carbon atoms and from 5 to 30 moles of ethylene oxide.

3. The detergent composition of claim 1 wherein the water-soluble organic detergent is an alkyl ether sulfate.

4. The detergent composition of claim 1 wherein the water-soluble organic detergent is the condensation product of a fatty alcohol and ethylene oxide.

5. The detergent composition of claim 4 wherein less than 10% water is present.

6. The composition of claim 5 wherein the component (b) is sodium carbonate and the calcium carbonate particles have a diameter of from about 0.01 to about 5 microns.

7. The composition of claim 1 wherein the organic nonionic detergent is an amine oxide of the formula $$R^1R^2R^3N \rightarrow O$$

wherein $R^1$ is an alkyl group containing from about 10 to about 28 carbon atoms, from 0 to about 2 hydroxy groups and from about 0 to about 5 ether linkages, and $R^2$ and $R^3$ are selected from the group consisting of alkyl radicals and hydroxy alkyl radicals containing from about 1 to about 3 carbon atoms.

8. The composition of claim 7 wherein the amine oxide is dimethyl dodecyl amine oxide.

9. The composition of claim 8 wherein the component (b) is sodium carbonate and the calcium carbonate particles have a diameter of from about 0.01 to about 5 microns.

10. The detergent composition of claim 1 wherein less than 10% water is present.

11. The detergent composition of claim 10 wherein the salt is sodium carbonate.

12. The detergent composition of claim 11 wherein the organic detergent is an alkyl ether sulfate which is the reaction product of one mole of a fatty alcohol having from 10 to 18 carbon atoms with from 3 to 12 moles of ethylene oxide.

13. The composition of claim 12 wherein the calcium carbonate particles have a diameter of from about 0.01 to about 5.0 microns.

* * * * *